(12) United States Patent
Miller et al.

(10) Patent No.: US 11,713,688 B2
(45) Date of Patent: Aug. 1, 2023

(54) PRESSURE-BALANCED CARBON SEAL

(71) Applicant: Raytheon Technologies Corporation, Farmington, CT (US)

(72) Inventors: Jonathan Logan Miller, Belchertown, MA (US); Thomas P. Obligado, Cobalt, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/541,712

(22) Filed: Dec. 3, 2021

(65) Prior Publication Data

US 2023/0175409 A1 Jun. 8, 2023

(51) Int. Cl.
*F01D 11/00* (2006.01)
*F16J 15/3284* (2016.01)

(52) U.S. Cl.
CPC ......... *F01D 11/001* (2013.01); *F16J 15/3284* (2013.01); *F05D 2240/55* (2013.01)

(58) Field of Classification Search
CPC .. F01D 11/001; F16J 15/3284; F05D 2240/55
See application file for complete search history.

(56) References Cited

U.S. PATENT DOCUMENTS

| | | | |
|---|---|---|---|
| 4,211,424 A | 7/1980 | Stein | |
| 5,058,904 A | 10/1991 | Nevola | |
| 5,145,189 A | 9/1992 | Pope | |
| 5,509,664 A | 4/1996 | Borkiewicz | |
| 5,558,341 A | 9/1996 | McNickle et al. | |
| 6,145,843 A * | 11/2000 | Hwang | F16J 15/442 277/400 |
| 7,770,895 B2 | 8/2010 | Zheng et al. | |

(Continued)

FOREIGN PATENT DOCUMENTS

| | | |
|---|---|---|
| EP | 0803668 A1 | 10/1997 |
| EP | 2886915 A1 | 6/2015 |

(Continued)

OTHER PUBLICATIONS

Brian P. Roche, "Bulkhead Seals—A Sealing Solution", Feb. 11, 2008, Stein Seal Co., Kulpsville, Pennsylvania.

(Continued)

*Primary Examiner* — Igor Kershteyn
*Assistant Examiner* — Theodore C Ribadeneyra
(74) *Attorney, Agent, or Firm* — Bachman & LaPointe, P.C.

(57) ABSTRACT

A seal segment has an arcuate body having: a first end; a second end circumferentially opposite the first end; a first face; a second face axially opposite the first face; an inner diameter (ID) face; and an outer diameter (OD) face. The seal segment is shaped to interfit with a plurality of identical seal segments first end to second end to form a seal surrounding a central longitudinal axis. The first face has: a circumferential channel closer to the ID face than the OD face; and a plurality of channels extending from the circumferential channel to the OD face. The ID face has: a circumferential channel closer to the first face than the second face; and a plurality of channels extending from the circumferential channel to the second face. The ID face circumferential channel has an open end.

21 Claims, 11 Drawing Sheets

(56) References Cited

U.S. PATENT DOCUMENTS

| | | | |
|---|---|---|---|
| 7,914,007 B2 * | 3/2011 | Berard | F16J 15/3244 |
| | | | 277/544 |
| 7,931,277 B2 * | 4/2011 | Garrison | F16J 15/441 |
| | | | 277/400 |
| 8,074,995 B2 * | 12/2011 | Vasagar | F16J 15/441 |
| | | | 277/416 |
| 8,091,898 B2 * | 1/2012 | Garrison | F16J 15/442 |
| | | | 277/416 |
| 8,342,534 B2 * | 1/2013 | Vasagar | F16J 15/3244 |
| | | | 277/411 |
| 8,356,819 B2 * | 1/2013 | Vasagar | F16J 15/441 |
| | | | 277/411 |
| 8,408,554 B2 * | 4/2013 | Vasagar | F16J 15/40 |
| | | | 277/416 |
| 8,408,556 B2 * | 4/2013 | Vasagar | F16J 15/3244 |
| | | | 277/416 |
| 8,616,554 B2 * | 12/2013 | Vasagar | F16J 15/3244 |
| | | | 277/579 |
| 8,905,407 B2 * | 12/2014 | Ruggeri | F16J 15/442 |
| | | | 277/400 |
| 9,638,326 B2 | 5/2017 | Haynes | |
| 9,695,940 B2 | 7/2017 | Haynes et al. | |
| 10,393,272 B2 | 8/2019 | Mosley | |
| 10,539,034 B2 * | 1/2020 | Miller | F01D 11/003 |
| 11,408,511 B2 * | 8/2022 | Lavin | F16J 15/442 |
| 2003/0071422 A1 * | 4/2003 | Holder | F16J 15/442 |
| | | | 277/348 |
| 2010/0164183 A1 * | 7/2010 | Berard | F16J 15/442 |
| | | | 277/544 |
| 2012/0223490 A1 * | 9/2012 | Ruggeri | F16J 15/442 |
| | | | 277/632 |
| 2016/0169389 A1 * | 6/2016 | Haynes | F16J 15/26 |
| | | | 277/544 |
| 2021/0190208 A1 | 6/2021 | Berard et al. | |

FOREIGN PATENT DOCUMENTS

| | | |
|---|---|---|
| EP | 3385507 A1 | 10/2018 |
| EP | 3865740 A1 | 8/2021 |

OTHER PUBLICATIONS

European Search Report dated May 11, 2023 for European Patent Application No. 22210021.6.

* cited by examiner

PRESSURE-BALANCED CARBON SEAL

BACKGROUND

The disclosure relates to gas turbine engines. More particularly, the disclosure relates to seals for isolating oil-containing bearing compartments.

Gas turbine engines (used in propulsion and power applications and broadly inclusive of turbojets, turboprops, turbofans, turboshafts, industrial gas turbines, and the like) include multiple main bearings (e.g., rolling element bearings—thrust and/or radial) supporting one spool relative to another or relative to grounded structure (e.g. a case).

The bearings are exposed to oil for lubrication and/or cooling. The oil may be passed as a recirculating flow that is passed to the bearings and then collected (scavenged) and ultimately returned to the bearings. To isolate the oil to bearing compartments, each associated with and containing one or more of the bearings, seal systems are used. Example seal systems are carbon seal systems.

To limit oil leakage past the seals, the seals may be buffered by delivering air (e.g., bleed air) to spaces opposite the compartments across the seals so that the compartments are at a lower pressure than the pressurized spaces.

In one group of two-spool engine configurations, a particularly relevant bearing compartment is located radially under the combustor, forward of the high pressure turbine (HPT). The high-pressure buffer air taken from the high pressure compressor (HPC) may pass through a cooler and have its pressure stepped down in one or more stages before entering the bearing compartment. A target delta pressure difference relative to the compartment may be maintained to limit any oil leakage. In various examples, a contacting carbon seal allows the required pressure drop.

Carbon seal systems are generally divided between face seals and shaft seals. In face seals, a generally radially-extending sealing face of the seal is in contact with a generally radially-extending seat surface of a member rotating relative to the seal. In a shaft seal, an inner diameter (ID) sealing surface of the seal is in sealing engagement/contact with outer diameter (OD) surface of a seat (which may include a surface of the shaft main body or a surface of a separate seat such as a cantilevered runner mounted by a proximal flange or the like).

A significant genus of shaft seals made by a variety of manufacturers have circumferentially segmented seals with each segment having first circumferential end features interfitting/mating with second circumferential end features of an identical adjacent segment. An example number of segments in such a circumferential array of segments forming a seal is three segments to twelve segments. The segments are biased circumferentially inward via a garter spring (e.g., tension coil spring) encircling the array and captured in an outer diameter (OD) groove of each segment. The segments are axially captured between adjacent surfaces of a seal housing mounting the seal. In a typical implementation, a circumferential array of coil springs bias the seal from a high pressure side surface of housing to a low pressure side surface of the housing.

For distribution of high pressure gas (e.g., the buffer air), the seals typically have open passageways along the respective low pressure face and ID face. These passageways typically include a circumferential groove (channel) in a relatively low pressure location: 1) in the seal low pressure face near the inner diameter of the contact between the seal low pressure face and adjacent housing low pressure face; and 2) in the ID face relatively closer to the bearing compartment. These circumferential grooves may be fed via axial grooves respectively extending from the OD for the low pressure face and extending from the high pressure face for the ID face. On such seals, intact material on the low pressure face between the low pressure face groove and the ID face forms a face dam and intact material of the ID face between the ID groove and low pressure face forms an ID dam. These dams form regions of pressure drop and are desirably minimized in span (subject to sufficiency against wear) to minimize the reduction in buffering. See FIG. 6 of Roche, Brian P., "Bulkhead Seals—A Sealing Solution", Feb. 11, 2008, Stein Seal Co., Kulpsville, Pa.

One example of such a configuration is shown in U.S. Pat. No. 5,058,904 (the '904 patent) of Nevola, entitled "Self-Contained Sealing Ring Assembly", and granted Oct. 22, 1991. Such circumferential grooves function to reduce contact forces to limit wear while countering oil leakage from the oil side (e.g., bearing compartment) to the air side (e.g., buffer chamber).

US Patent Application Publication No. 2021/0190208A1 (the '208 publication) of Berard et al., entitled "Self-Correcting Hydrodynamic Seal", and published on Jun. 24, 2021 discloses a variation wherein at one circumferential end of the seal segment, the circumferential groove in the low pressure face is open to that circumferential end. This feeds air to the inter-segment gap.

SUMMARY

One aspect of the disclosure involves a seal segment having an arcuate body having: a first end; a second end circumferentially opposite the first end; a first face; a second face axially opposite the first face; an inner diameter (ID) face; and an outer diameter (OD) face. The seal segment is shaped to interfit with a plurality of identical seal segments first end to second end to form a seal surrounding a central longitudinal axis. The first face has: a circumferential channel closer to the ID face than the OD face; and a plurality of channels extending from the circumferential channel to the OD face. The ID face has: a circumferential channel closer to the first face than the second face; and a plurality of channels extending from the circumferential channel to the second face. The ID face circumferential channel has an open end.

In a further embodiment of any of the foregoing embodiments, additionally and/or alternatively, the body is a majority by weight carbon.

In a further embodiment of any of the foregoing embodiments, additionally and/or alternatively: the first end has a circumferential protrusion at the first face and ID face; the second end has a circumferential rebate at the first face and ID face; and the interfitting first end to second end is of the protrusion of each segment in the rebate of an adjacent segment.

In a further embodiment of any of the foregoing embodiments, additionally and/or alternatively, the open end is at the first end.

In a further embodiment of any of the foregoing embodiments, additionally and/or alternatively, the first face circumferential channel has a closed end proximate the first end.

In a further embodiment of any of the foregoing embodiments, additionally and/or alternatively: the first face circumferential channel has a depth $H_1$; and the ID face circumferential channel has a depth $H_2$ 120% to 500% of the first face circumferential channel depth $H_1$.

In a further embodiment of any of the foregoing embodiments, additionally and/or alternatively: the first face circumferential channel has a width $W_1$; and the ID face circumferential channel has a width $W_2$ 50% to 150% of the first face circumferential channel width $W_1$.

In a further embodiment of any of the foregoing embodiments, additionally and/or alternatively: the first face has a dam radially inward of the first face circumferential channel and having a radial span $S_1$; and the ID face has a dam axially between the ID face circumferential channel and the first face and having an axial span $S_2$ of 20% to 60% of $S_1$.

In a further embodiment of any of the foregoing embodiments, additionally and/or alternatively: the first face circumferential channel has a depth $H_1$; the ID face circumferential channel has a depth $H_2$ 120% to 500% of the first face circumferential channel depth $H_1$; and the ID face dam span $S_2$ is greater than the first face circumferential channel depth $H_1$.

In a further embodiment of any of the foregoing embodiments, additionally and/or alternatively, a turbomachine comprises: a bearing in a bearing compartment; a buffer chamber; and a seal system isolating the bearing compartment from the buffer chamber. The seal system comprises: a seal runner; a segmented seal encircling the seal runner comprising a plurality of the seal segments interfitting first end to second end; a garter spring holding the seal segments together; a seal housing carrying the seal and having a first wall and a second wall; and at least one spring biasing the seal segment first faces against the housing first wall. For each seal segment, a buffer flowpath from the buffer chamber to the bearing compartment extends from the second face, through the ID face plurality of channels to the ID face circumferential channel and out the ID face circumferential channel open end.

In a further embodiment of any of the foregoing embodiments, additionally and/or alternatively, the garter spring holds the seal in contact with a seal runner.

In a further embodiment of any of the foregoing embodiments, additionally and/or alternatively, the plurality of seal segments is three to twelve segments.

In a further embodiment of any of the foregoing embodiments, additionally and/or alternatively, the seal is a non-archbound seal.

In a further embodiment of any of the foregoing embodiments, additionally and/or alternatively, the at least one spring is a plurality of coil springs.

In a further embodiment of any of the foregoing embodiments, additionally and/or alternatively, for each seal segment: the first end has a circumferential protrusion at the first face and ID face; and the second end has a circumferential rebate at the first face and ID face; the interfitting first end to second end is of the protrusion of each segment in the rebate of an adjacent segment; the open end is at the first end; and the interfitting leaves a gap between an end of each protrusion and a base of each rebate.

In a further embodiment of any of the foregoing embodiments, additionally and/or alternatively, a method for using the turbomachine comprises: driving rotation of a shaft carrying the runner; and passing an airflow along the buffer flowpath from the buffer chamber to the bearing compartment.

In a further embodiment of any of the foregoing embodiments, additionally and/or alternatively, the method further comprises: directing another airflow for each seal segment from the OD face, through the first face plurality of channels to the first face circumferential channel to pass as a leakage flow over a first face dam radially inward of the first face circumferential channel.

In a further embodiment of any of the foregoing embodiments, additionally and/or alternatively, the airflow has a first flow rate; and the another airflow has a second flow rate less than half of the first flow rate.

In a further embodiment of any of the foregoing embodiments, additionally and/or alternatively, the rotation is in an angular direction from the ID face circumferential channel out the ID face circumferential channel open end for the segments.

In a further embodiment of any of the foregoing embodiments, additionally and/or alternatively, the rotation is effective to drive debris from the ID face circumferential channel.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
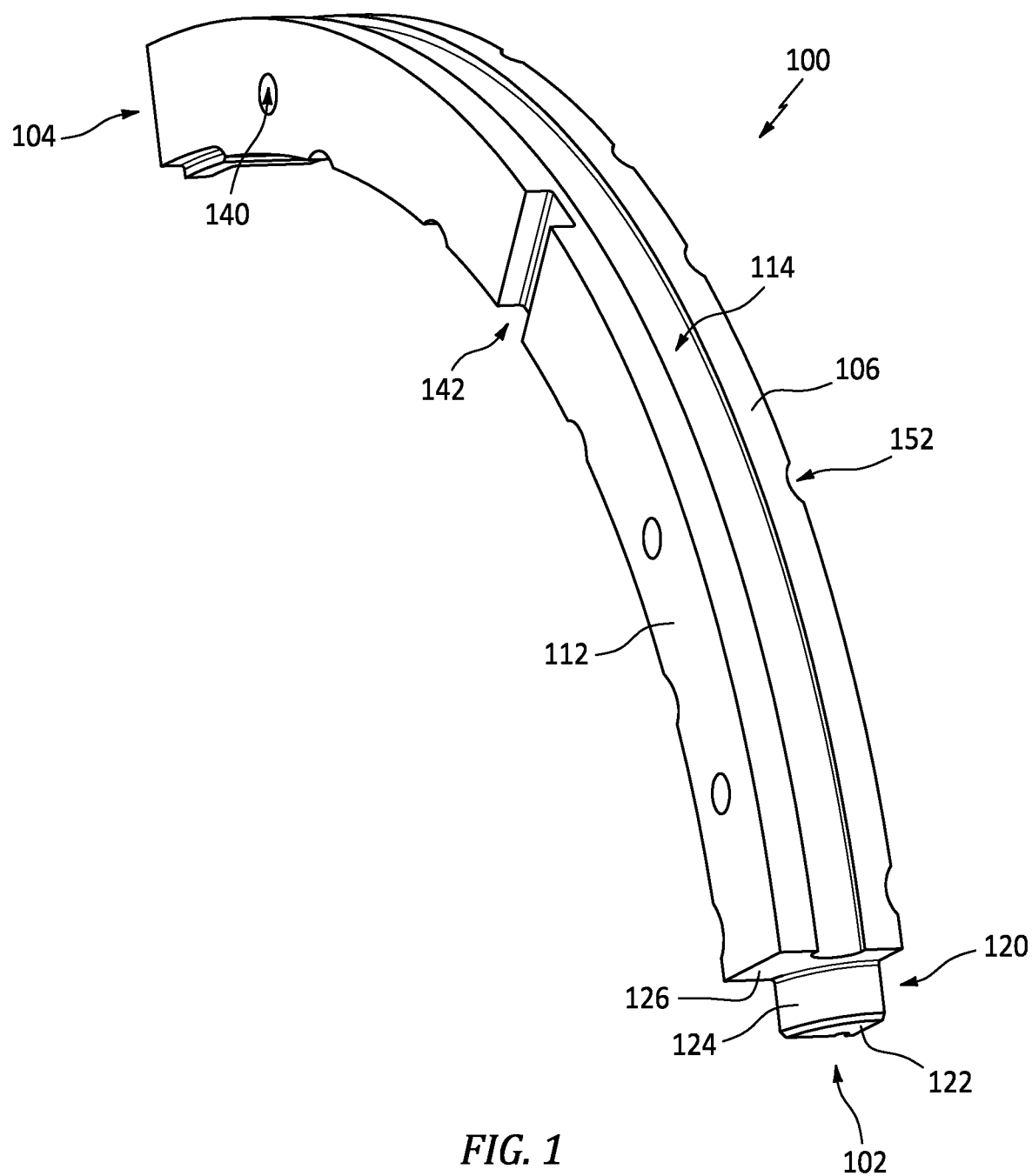
FIG. 1 a first view of a seal segment of a seal system.
Figure 2:
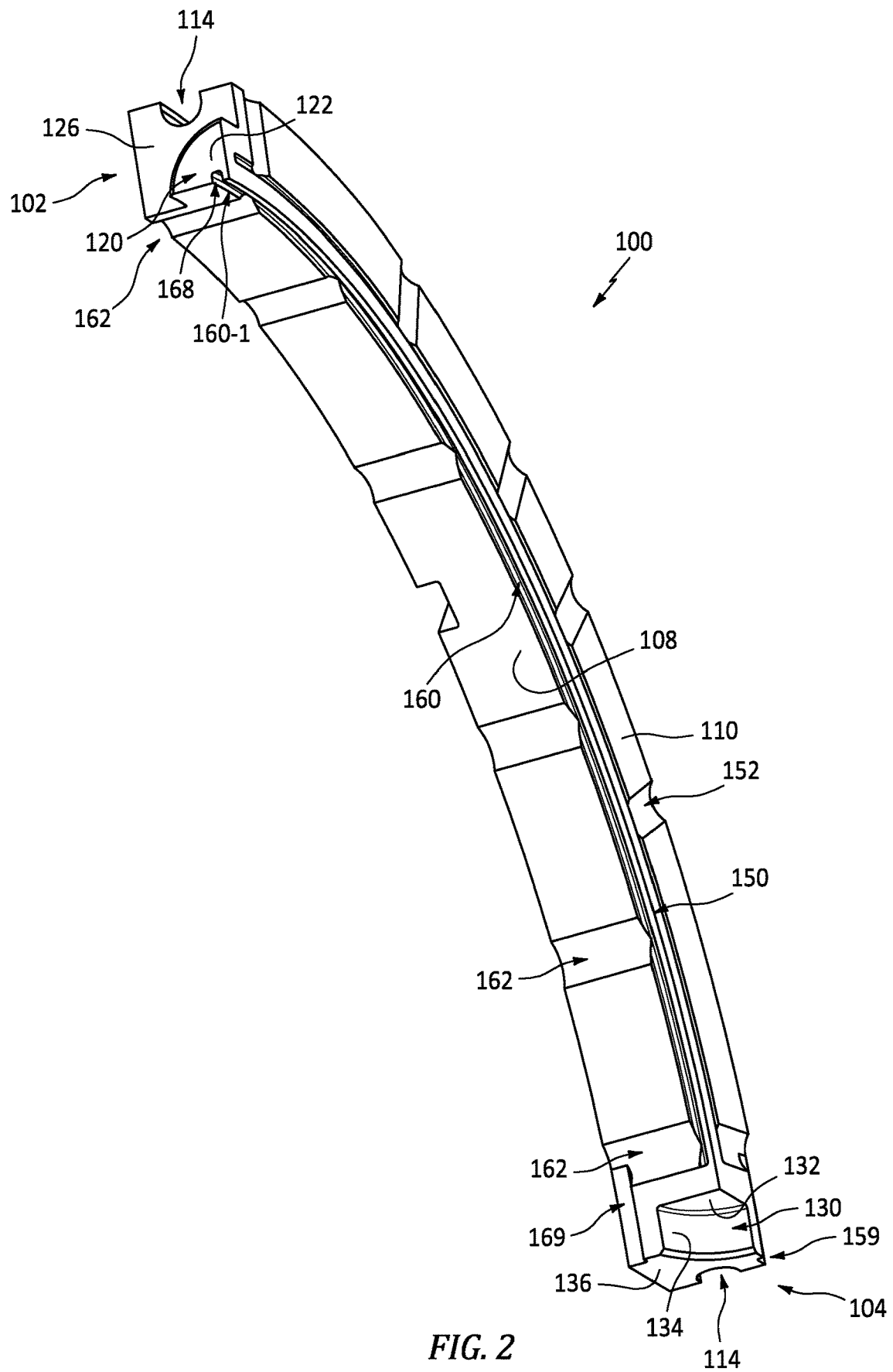
FIG. 2 is a second view of the seal segment.

FIG. 1 shows a seal segment 100 formed as an arcuate body extending from a first circumferential end (first end) 102 to a second circumferential end (second end) 104. The segment has an outer diameter (OD) face 106 and an inner diameter (ID) face 108 (FIG. 2). The segment has a first axial face 110 (axially facing, radially and circumferentially extending) and a second axial face 112 (FIG. 1). A seal stage (seal) is formed by a plurality of identical segments 100 in a circumferential array interfitting first end 102 to second end 104.

As is discussed further below, the seal may be used in a system in a turbomachine such as a gas turbine engine for a purpose such as isolating a bearing compartment.

As is discussed further below, to hold the segments in the array, the segments have an outer diameter (OD) groove 114 (FIG. 1) in the OD face 106 for receiving a circumferentially-extending garter spring (discussed below). The segment first end 102 comprises a protrusion 120 extending to an end face 122. An example protrusion 120 is adjacent an intersection of the first face 110 and ID face 108. The protrusion has a side face (surface) 124 facing generally radially outward and axially toward the second face 112 and extending circumferentially to a shoulder surface 126 which, in turn, merges with the OD face 106 and second face 112. An example surface 124 is arcuate when viewed in axial section.

Figure 3:
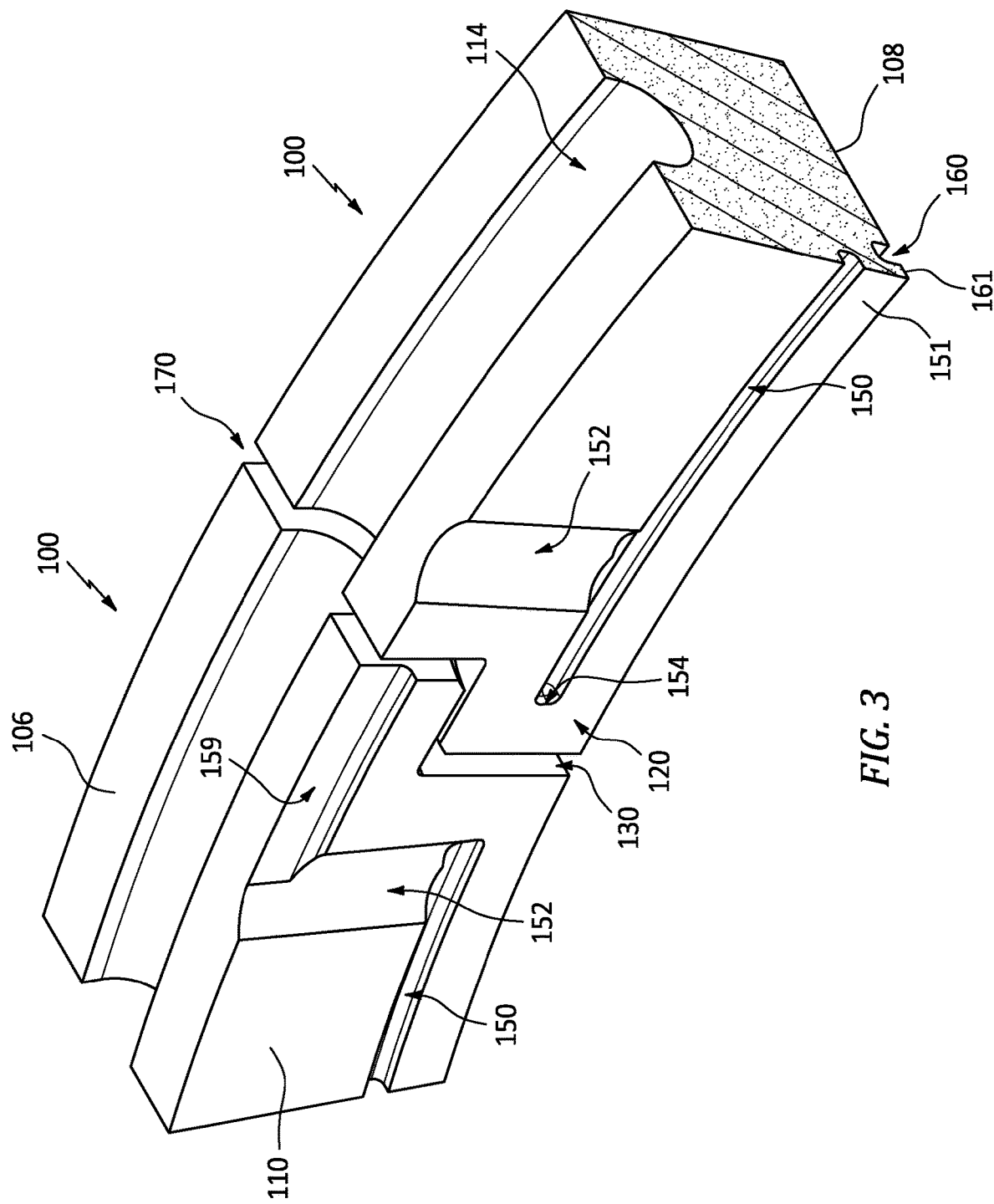
FIG. 3 is a cutaway view of a segment-to-segment junction in a seal formed by an array of the segments.

The second end 104 (FIG. 2) has a rebate 130 complementary to the first end 102 protrusion 120 so as to receive the protrusion 120 when the segments are interfitted end to end (FIG. 3). Thus, the rebate 130 has a base surface 132 (FIG. 2) and a lateral face 134 with the lateral face extending to an end face 136. In the end to end interfitting, the base surface 132, lateral face 134, and end face 136 respectively face the end face 102, side face 124, and shoulder surface 126.

The second face 112 (FIG. 1) includes a circumferentially distributed plurality of coil spring pockets 140 formed as blind (closed ended) pockets for receiving coil springs to axially bias the seal so that the first face 110 engages an associated/adjacent face (discussed below) of a seal housing. Additionally, the second face 112 includes an anti-rotation feature 142 (e.g., shown as a radially-extending slot) for engaging a complementary feature (e.g., lug—not shown) on the seal housing to constrain movement about the centerline of the engine.

For pressure buffering, the example seal segment 100 includes buffering features along both the first face 110 and ID face 108. The first face buffering features comprise a circumferential channel 150 and a plurality of feed channels 152 extending radially between the OD face 106 and the circumferential channel 150.

Similarly, the ID face 108 includes a circumferential channel 160 and a plurality of feed channels 162 extending axially from the second face 112 to the circumferential channel 160.

A portion of the first face 110 radially inward of the channel 150 forms a dam 151 (FIG. 3). Similarly, a portion of the ID face 108 to the first face 110 side of the channel 160 forms a dam 161. The example dams are flush dams flush to remaining intact portions of the flat/planar first face 110 and circular cylindrical ID face 108.

With the channels 150 and 160 respectively radially inboard (nearer the ID face 108 than the OD face 106) and nearer the sealing face (the first face 110 rather than the second face 112) the dams 151 and 161 form relatively small fractions of the respective radial span and axial span of the seal segment.

Figure 8:
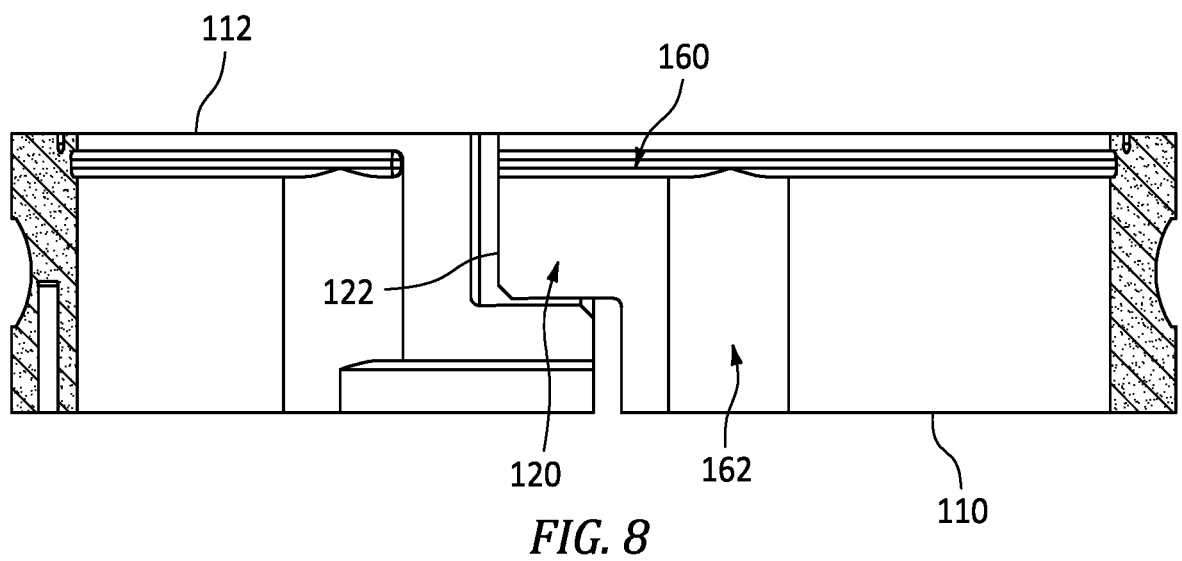
FIG. 8 is an inner diameter (ID) view of the junction.

The first face circumferential channel 150 has a blind (closed) end 154 (FIG. 3) along the protrusion 120. The ID face 108 circumferential channel 160 (FIG. 8) is open to the protrusion end face 122 (thus having an open end 168 (FIG. 2) at the end face 122). A terminal portion 160-1 of the circumferential channel 160 thus extends from the closest feed channel 162 to the open end or opening 168. This is in distinction to the reversed arrangement in the '208 publication discussed above (where only a channel on the first face 110 has such an open end). As is discussed further below, in various embodiments, such a reversal may allow one or more of: more advantageous pressure balancing; greater air flow; more tolerance to wear; and greater structural integrity adjacent sealing dams 151, 161.

As is discussed further below, FIG. 3 shows a junction 170 between adjacent seal segments characterized by the circumferential gap between the protrusion end face 122 and the rebate base surface 132 on the one hand and the shoulder surface 126 and end face 136 on the other hand. Transverse thereto, an at least initially smaller gap is formed between the protrusion side or lateral face 124 and the rebate lateral face 134. In operation, as the seal wears, the segments will move radially inward and the circumferential gap will partially close. However, the circumferential gap allows the seal to be non-archbound in operation for maintaining contact between the segment ID faces 108 and the seal runner OD face (discussed below).

FIG. 3 further shows the feed channel 152 closest the second circumferential end 104 as open to a rebate 159 spanning the junction between the OD face 106 and the first face 110. The example rebate 159 is open to the second end 104. Similarly, the feed channel 162 (FIG. 2) closest the second end 104 also is open to a rebate 169 spanning between the ID face 108 and the second face 112 and also open to the second end face 136. The rebates 159 and 169 provide an advantageous pressure balance in circumferential locations lacking the channels 150 and 160 respectively. The channels 150 and 160 locally shift the pressure drop to the dam contact spans. In locations without the channels 150 and 160 the drop would be over a more remote span (radially outward for the first face 110 and toward the second face 112 for the ID face 108). The rebates 159 and 169 shift the pressure drops respectively radially inward and toward the first face 110 to limit adverse contact loads.

Figure 11:
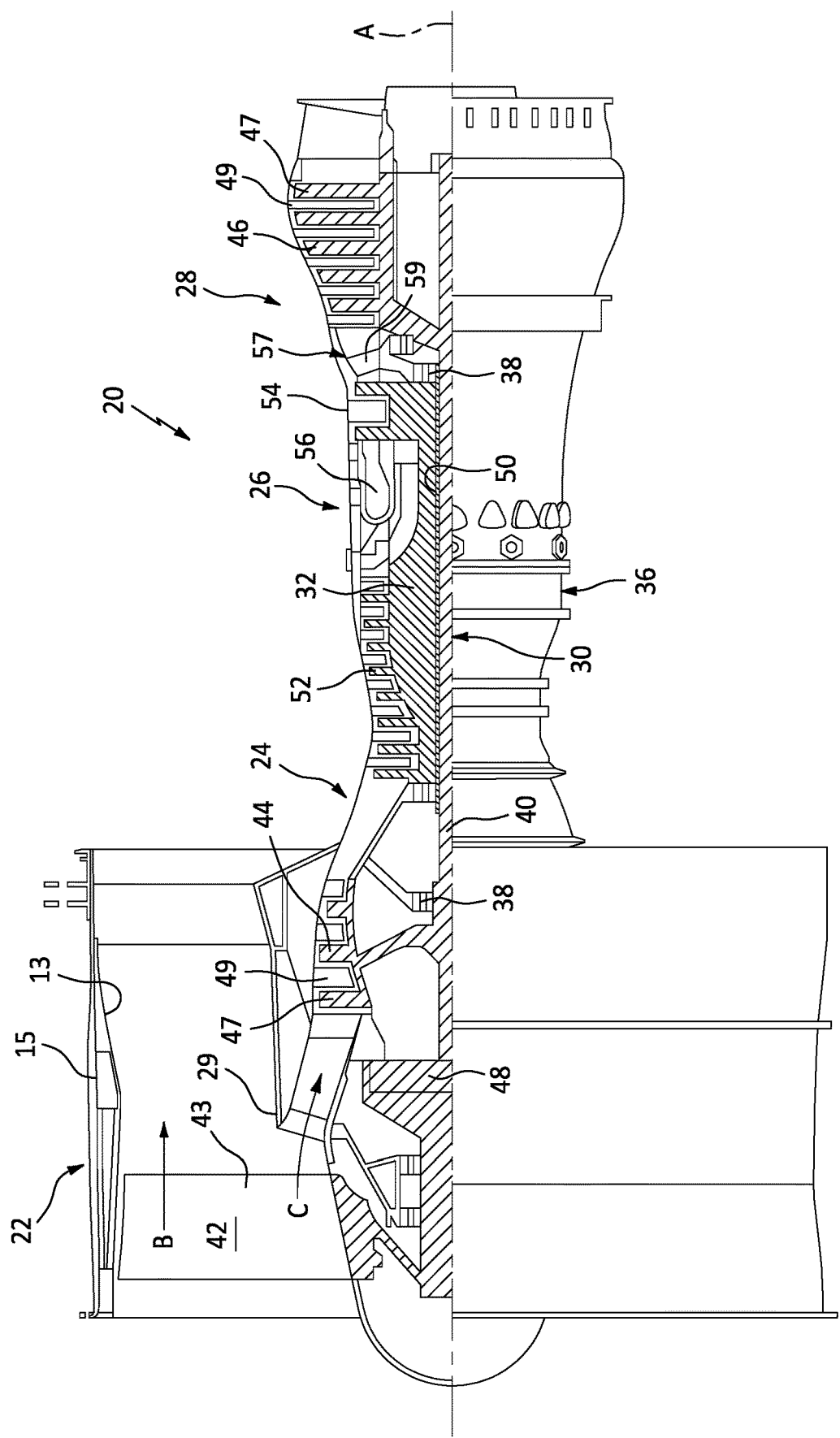
FIG. 11 is a schematic view of a gas turbine engine in which the seal system may be included.

FIG. 11 schematically illustrates a gas turbine engine 20 as one of many examples of an engine in which a seal system including the segments 100 may be used. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the example gas turbine engine 20 is illustrated as a geared architecture 48 to drive the fan 42 at a lower speed than the low speed spool 30. The inner shaft 40 may interconnect the low pressure compressor (LPC) 44 and low pressure turbine (LPT) 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor (HPC) 52 and a second (or high) pressure turbine (HPT) 54. A combustor 56 is arranged in the example gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

Figure 9:
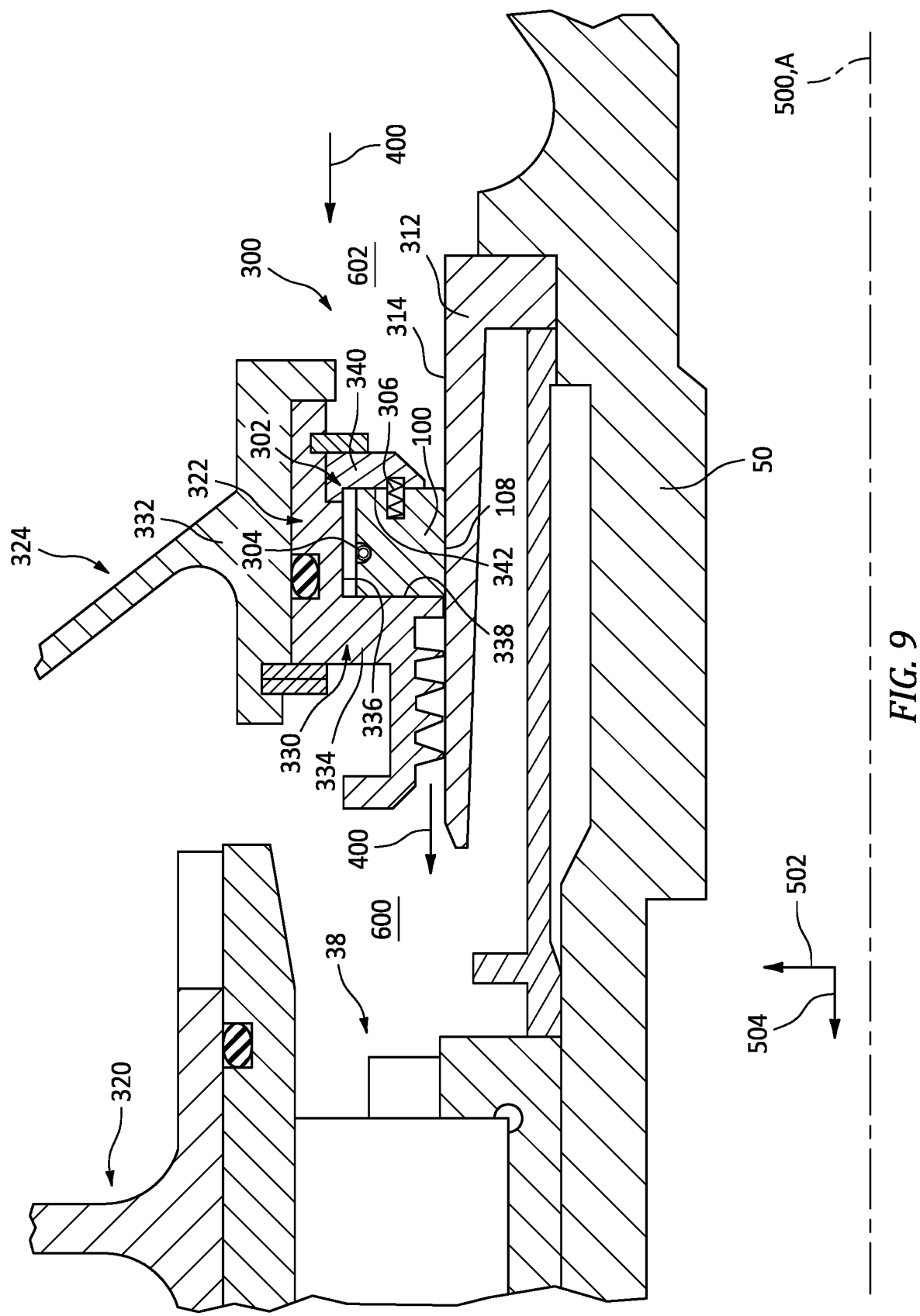
FIG. 9 is a partially schematic central axial sectional view of a seal system.

FIG. 9 shows a seal system 300 including a seal 302 formed by the end-to-end array of segments 100 and secured by the aforementioned garter spring 304. The example garter spring is a metallic tension coil spring with ends hooked to each other. As is discussed below, FIG. 9 further shows the compression coil springs 306 in the pockets 140.

As is discussed further below, the seal system is used in a turbomachine such as a gas turbine engine 20 for a purpose such as isolating a bearing compartment 600 containing one or more of the bearings 38. A central longitudinal axis 500 of the seal 302 is normally coincided with the axis A of relative rotation between a first member and a second member. As is discussed further below, in an example implementation, the first member is engine static structure and the second member is a shaft assembly (e.g., of a high speed spool 32 shaft 50).

FIG. 9 further shows an outward radial direction 502 and a forward direction 504. The second member comprises one or more pieces 312 forming a runner for the seal 302. The runner has an outer diameter (OD) surface or face 314 radially facing and contacting the seal segment ID faces 108.

The example seal system is at an aft end of the bearing compartment 600. A similar or other seal system may be at a forward end. The example bearing compartment 600 contains a bearing supporting the second member for rotation relative to the first member about the axis A, 500. The example seal system 300 immediately isolates the bearing compartment 600 from a second space or volume 602. The example second space or volume 602 is a buffer chamber.

FIG. 9 further shows the bearing 38 as a rolling element bearing (e.g., roller bearing) having an inner race mounted to the shaft 50 and an outer race mounted to a bearing support hub 320 of the static structure. Similarly, the seal system includes a seal housing assembly 322 carried by a seal support hub 324 of the static structure. The example seal housing assembly 322 includes a first piece 330 having an outer diameter (OD) wall section mounted within a collar portion 332 of the seal support hub. A wall section 334 extends radially inward from the collar portion. An inner diameter (ID) surface 336 of the collar portion 332 and an aft surface or face 338 of the wall section 334 form respective outer diameter (OD) and forward wall surfaces of a seal pocket of the seal housing assembly 322.

The example seal housing assembly 322 further includes a second piece 340 having a forward surface 342 forming an aft wall face of the seal pocket. Aft portions of the springs 306 are accommodated in associated spring pockets of the second piece 340. Thus, the springs 306 bias the seal (segment first faces 110) into contact with the surface 342. In the example, the second piece 340 is mounted to the first piece 330 via a split internal retaining ring. Similarly, the first piece is mounted to the seal support via a split internal retaining ring. These split retaining rings prevent movement in one axial direction and contacting shoulder surfaces prevent movement in the opposite axial direction. There may additionally be rotational keying means (not shown) such as splines or lugs and an additional O-ring seal is seen in the example.

Additionally, in the example, the first piece 330 further includes a toothed labyrinth seal section extending forward and in sealing interaction with a forward portion of the OD surface 314 of the seal runner.

As is discussed further below, the bearing compartment 600 contains oil which serves various lubrication and/or cooling functions including bearing lubrication and/or cooling and seal lubrication and/or cooling. To limit an oil leakage flow from the bearing compartment 600, a buffer air flow 400 is introduced passing through the buffer chamber 602. A portion of the buffer air flow may pass into the bearing compartment 600 due to the pressure difference between bearing compartment and buffer chamber 602. The flow(s) 400 may be exhausted to atmosphere from the bearing chamber 600 and/or combusted. As discussed above, the buffer flows also serve a pressure and force distribution function.

Materials and manufacture/assembly techniques may be conventional and may reflect a baseline turbomachine or seal segment being modified. Example segments 100 may be molded and/or machined. For example, there are numerous commercially available annular carbon seal blanks. Such a stock blank may be lathed to profile and may then have material milled and drilled away to reveal the non-annular features such as the grooves, spring compartments, and interfitting end features. For segmenting, fewer segments may be cut at a given axial location to allow for the interfitting end features. For example three segments for a four segment seal may be cut from a blank or an axial portion of a blank.

These commercial blanks are available in a variety of base carbon materials (e.g., carbon graphite and electrographite) with various impregnants (e.g., for strength/cohesion and/or lubricity) suitable for particular operating environments and conditions. Example material is at least 50% carbon by weight, more particularly, at least 90% or 95% or 99% or even commercially pure carbon with inevitable impurities.

Example runner materials are alloys (e.g., steel such as stainless steel, titanium alloys, and nickel-based superalloys) and alternatively ceramics.

Figure 10:
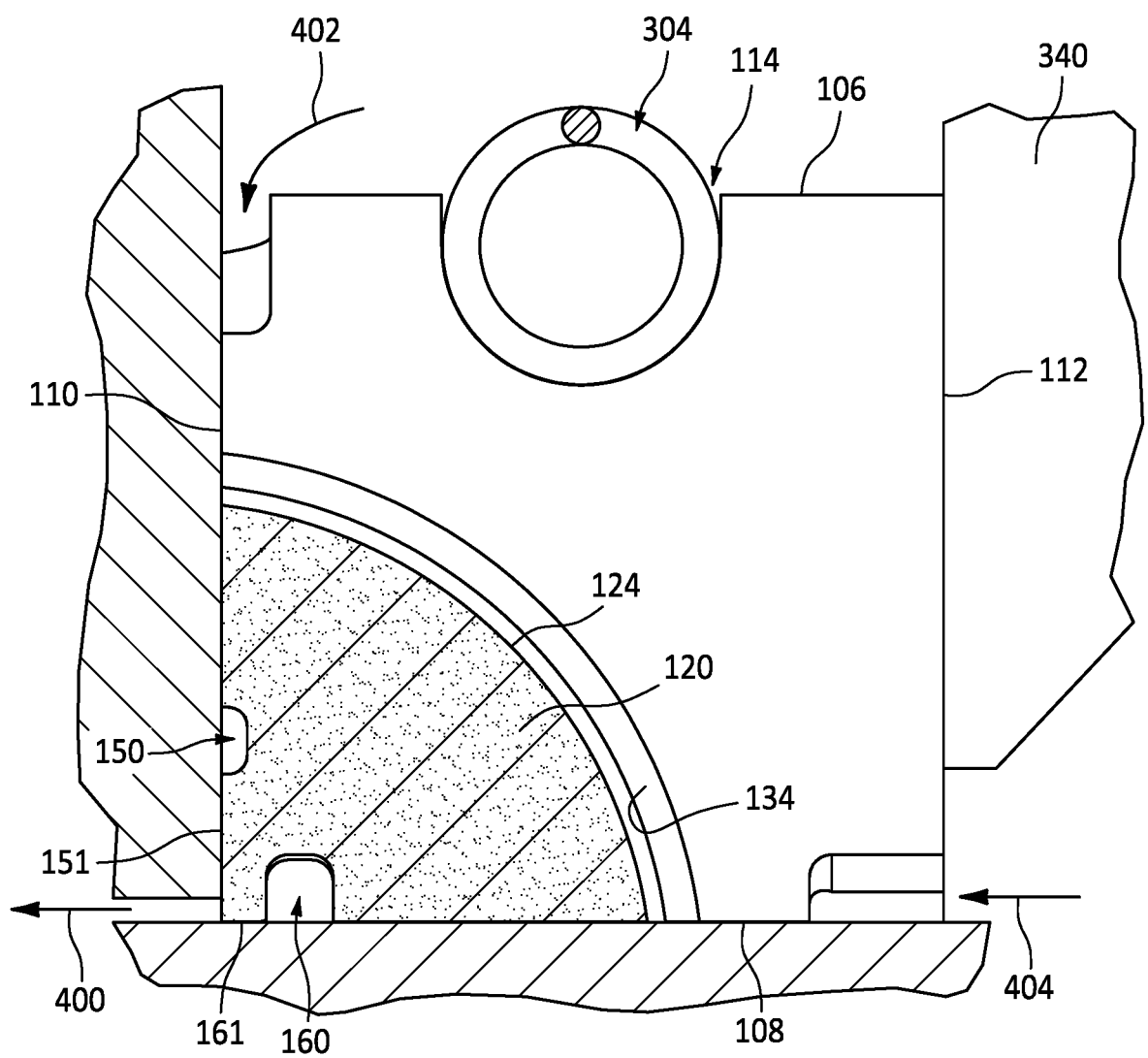
FIG. 10 is a central axial sectional view of seal engagement to a housing and runner.
Figure 10A:
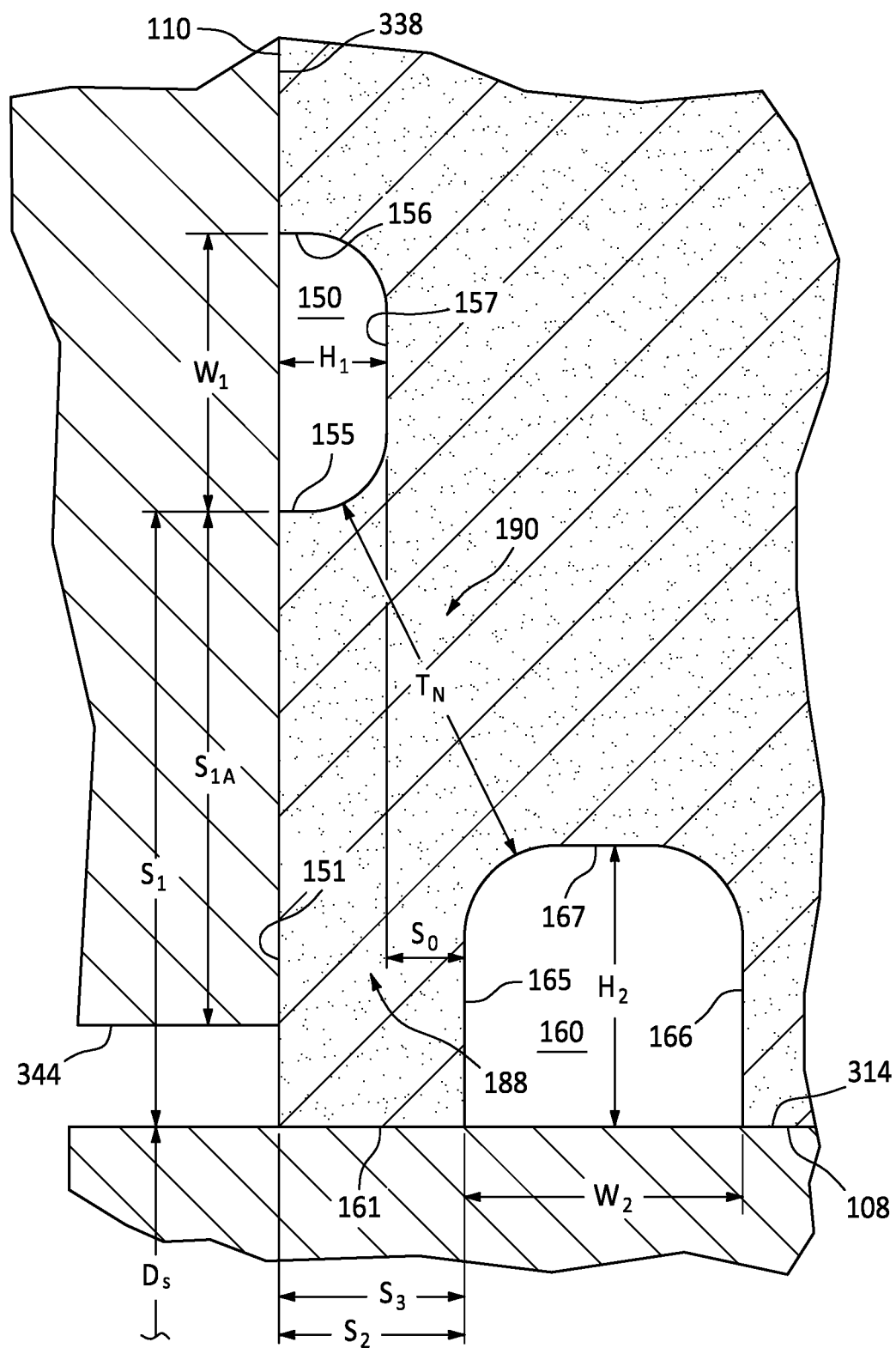
FIG. 10A is an enlarged view of a sealing dam region of the engagement of FIG. 10.

FIGS. 10 and 10A show the seal segment first face 110 in contact with the adjacent housing surface 338 and the seal ID face 108 in contact with the seal runner OD surface 314. Example seal runner OD surface 314 diameter Ds at the dam 161 is 15.0 cm, more broadly 2.0 cm to 40.0 cm for most engine applications. FIG. 10A further shows the first face channel 150 as having sidewall surfaces 155 and 156 and a base surface 157 with rounded transitions in cross-section. Similarly, the ID channel 160 has sidewall faces 165 and 166 and a base surface 167 with rounded transitions.

In FIG. 10A, a depth of the first face circumferential channel 150 is shown as $H_1$ and a width or radial span shown as $W_1$. Similarly, a depth of the ID face circumferential channel 160 is shown as $H_2$ and a width or axial span is shown as $W_2$. A radial span of the dam 151 is shown as $S_1$ with its portion overlapping the adjacent housing surface shown as $S_{1A}$. Thus, the overlapping portion extends radially between: a) the junction of the inner diameter sidewall surface 155 of the first face channel 150 and the first face dam 151, on the one hand; and b) an inner diameter (ID) surface 344 of the housing first piece wall section 334, on the other hand.

An axial span of the dam 161 is shown as $S_2$. An axial span between the wall surface 165 of the ID channel 160 and the housing first piece aft surface 338 is shown as $S_3$. Initially, for the example flush dam configuration of seal, $S_3$ and $S_2$ are coincident. As is discussed further below, during wear the relationship may change. It is thus seen that both dams are on a portion 188 of the segment cross-section joining a remainder of the segment at a cross-sectional neck 190 between the channels. Structural integrity of the cross-sectional neck 190 places limits on the depth and positioning of the channels. For example, for a given depth and position of the ID face channel 160, moving the first face channel 150 radially inward and/or increasing its depth will weaken the neck.

The cross-sectional neck 190 may be quantified as the minimum distance TN (neck thickness FIG. 10A) between the two channels 150 and 160. However, this dimension alone is not dispositive of structural integrity issues. Position and orientation of the neck may also be relevant. For example, there may be stress concentrations in a region extending radially outward from the side/face 165 of the channel 160 adjacent the dam 151. With larger $H_1$, the channel 150 will extend into this stressed region. With a shallow channel 150 (e.g., with no axial overlap of the two channels 150 and 160), the channel 150 extends less into the stressed region. FIG. 10A shows the channel 150 base surface 157 spaced forward of the channel 160 sidewall face 165 by a distance $S_0$. All things being equal, as $S_0$ decreases (e.g., due to increasing the depth $H_1$ or decreasing the span $S_2$) the line of the neck measuring $T_M$ will become more radial. Therefore, a given size neck or smaller neck may be sufficient to bear such stresses with a shallow channel 150. As is discussed below, such considerations may favor having the open channel end on the ID channel 160 rather than on the face channel 150 as in the '208 publication.

Figure 10B:
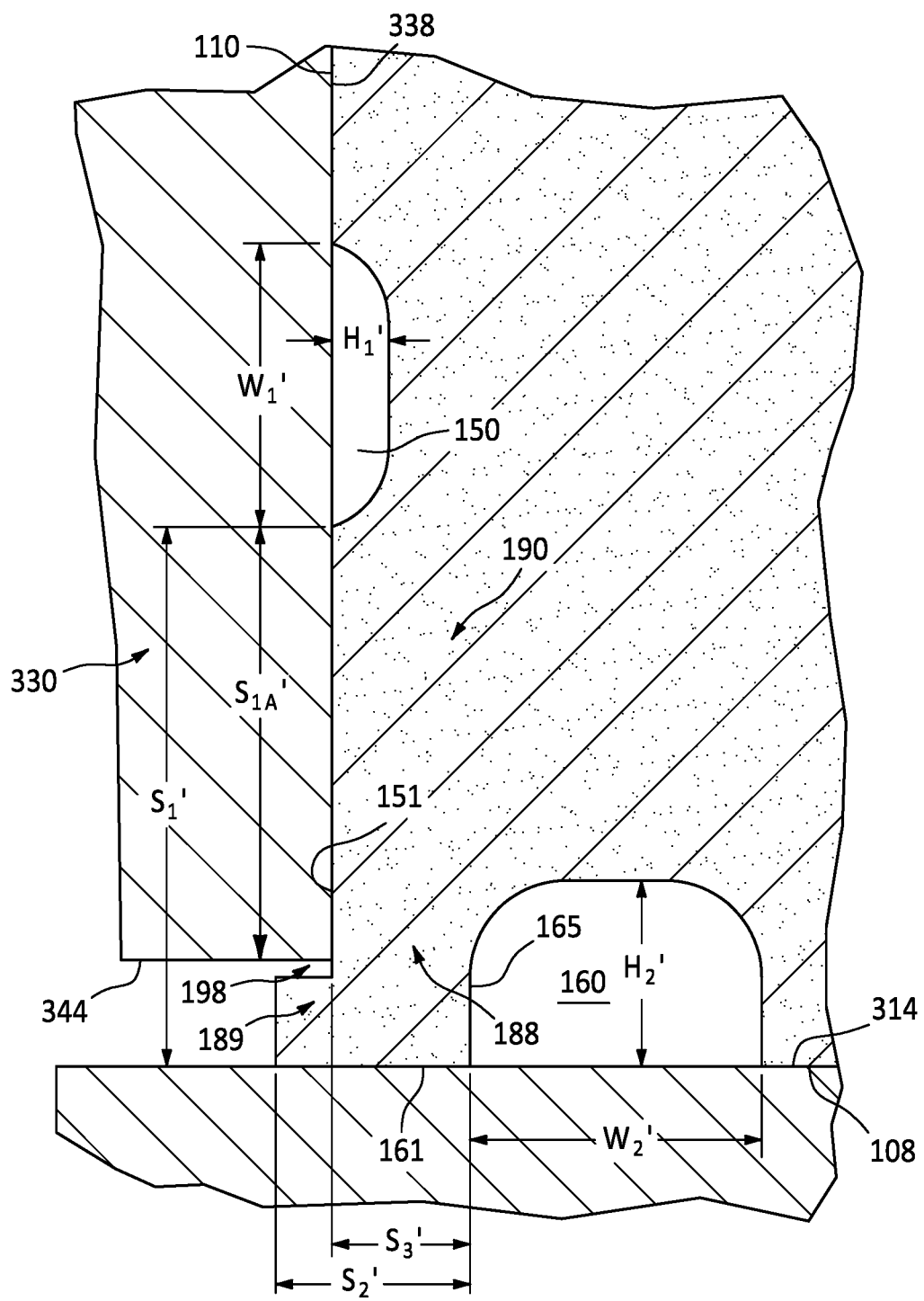
FIG. 10B is an enlarged view of the sealing dam region after substantial wear.

This partially relates to the effects of wear on the seal. FIG. 10B shows wear having decreased the first channel depth to $H_1'$ and the second channel depth to $H_2'$. The absolute depth decrease is greater for the ID channel 160 because of continuous wear by the relative rotation of shaft and seal versus the more oscillatory relative motion and associated wear of the housing face 338 against the seal first face (including dam 151). FIG. 10B further shows the housing first piece 330, wall section 334 wearing in the dam 151 to leave an inner diameter lip 189 radially inward of the ID surface 344. Although shown contacting the ID surface 344, oscillation may wear and/or break away at least an outer diameter portion of the protrusion 189 leaving a radial gap 198 with the ID surface 344.

The pressure balancing function of a channel without an open end may be achieved with low depth. Thus, the initial depth $H_1$ or $H_2$ may need to be only sufficient to leave a small final or residual depth at end of normal service life. However, such residual depth might otherwise be insufficient to provide the buffering air to the inter-segment gap through the open end. Thus, it may be more appropriate to deepen the groove 160 versus the groove 150 so that the final groove depth $H_2'$ remains sufficient to provide the inter-segment gap flow. This is because the deeper groove 160, at given spans $S_2$ and $S_{1A}$, does not cause the axial overlap of the two channels or degree thereof that deepening the face channel 150 would.

Figure 6:
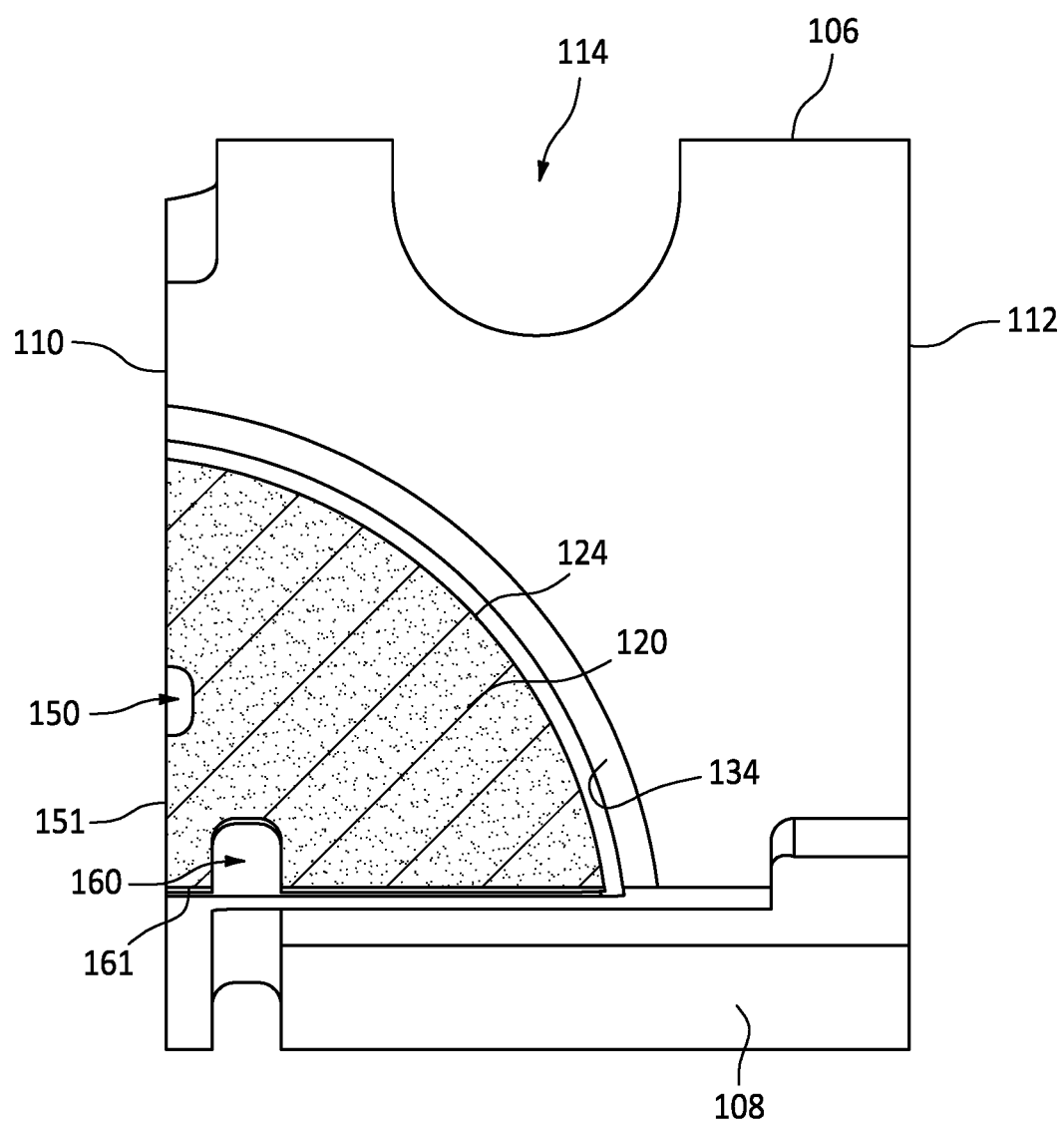
FIG. 6 is a central axial sectional view of the junction taken along line 6-6 of FIG. 4.
Figure 7:
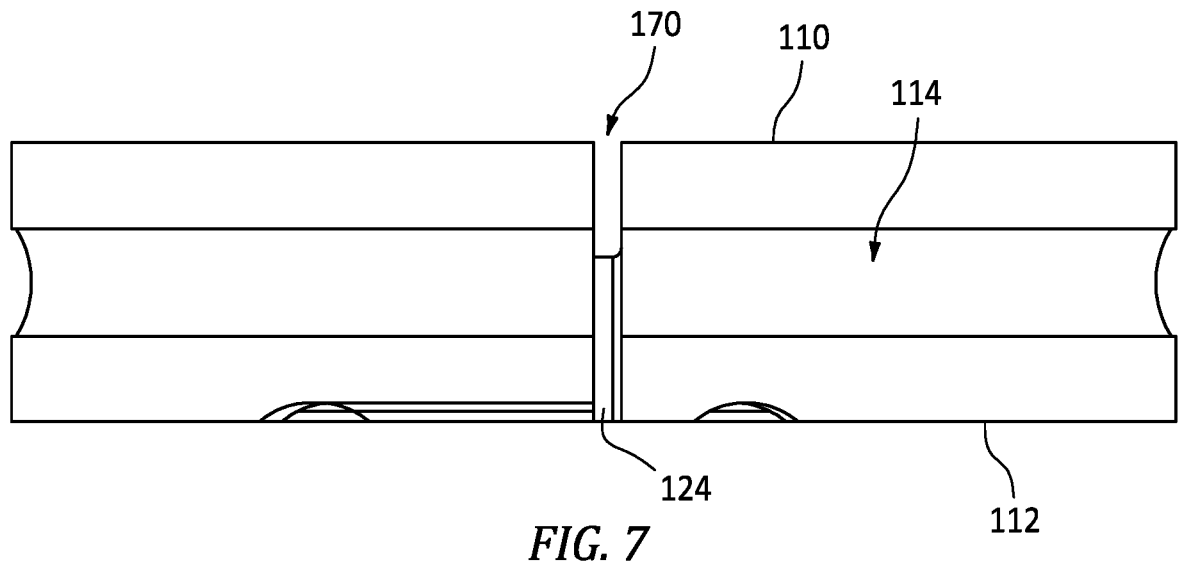
FIG. 7 is an outer diameter (OD) view of the junction.

The departure from the face circumferential slot opening of the '208 publication reflects a combination of factors. One factor involves the seat spans $S_1$ and $S_2$. It may be desirable to have small such spans to maximize the respective radial and axial areas over which the buffering air pressure acts. This results from a consideration of pressure balance. See FIG. 6 of Roche, Brian P., "Bulkhead Seals—A Sealing Solution", Feb. 11, 2008, Stein Seal Co., Kulpsville, Pa.

In one group of examples, pre-use $H_1$ is less than pre-use $H_2$. A pre-use ratio of Hz to $H_1$ may be more than 2:1, more particularly 2:1 to 4:1 or, more broadly, 1.5:1 to 8:1. This provides room for wear reducing $H_2$. At an end of scheduled life, a ratio of $H_2$ to $H_1$ may be similar, depending on the application.

Pre-use, example $H_1$ is 0.010 inch to 0.025 inch (0.25 mm to 0.64 mm), more particularly 0.30 mm to 0.50 mm, for an example 15.0 cm diameter seat. Pre-use, example $H_2$ is 0.025 inch to 0.060 inch (0.64 mm to 1.52 mm), more particularly 0.80 mm to 1.30 mm, for a 15.0 cm diameter seat.

Example $W_1$ and $W_2$ (pre and during use) may be roughly similar to each other. For example, $W_2$ may broadly be 30% to 200% of $W_1$, more particularly 50% to 150%. Example $W_1$ and $W_2$ are about 0.030 inch (0.76 mm), more broadly 0.5 mm to 2.0 mm.

Example span $S_1$ is greater than span $S_2$. $S_2$ pre-use may be an example 20% to 60% of $S_1$. Example span $S_1$ is 0.065 inch (1.65 mm), more broadly, 0.025 inch to 0.105 inch (0.64 mm to 2.7 mm). Example span $S_2$ is 0.020 inch (0.51 mm), more broadly, 0.015 inch to 0.030 inch (0.38 mm to 0.76 mm).

In operation, first branches or portions 402 (FIG. 10) of the flow 400 of FIG. 9 will pass into the circumferential channel 150 via the feed channels 152 and have a small leakage past the dam 151. More substantial second branches or portions 404 of the flow 400 will pass into the channel 160 via the associated feed channels 162. Although there may be leakage past the dam 161, substantial flow will exit the open end of the channel 160 to the inter-segment gap.

There may be additional branches of the flow 400 and its associated flowpath such as direct passage through the inter-segment gaps.

Figure 4:
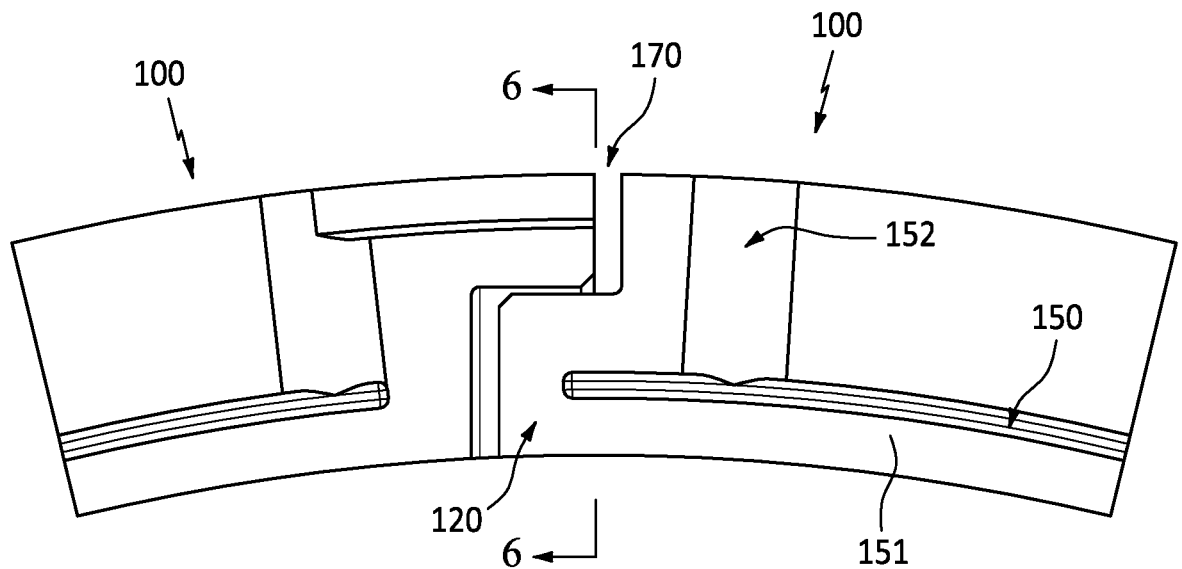
FIG. 4 is a first face view of the junction.
Figure 5:
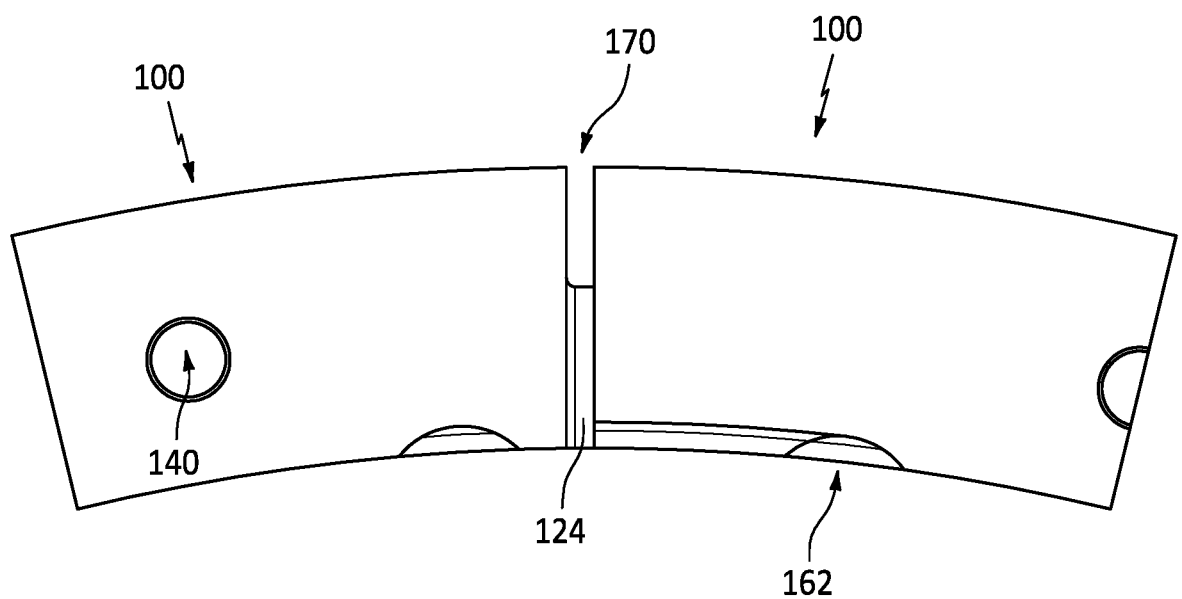
FIG. 5 is a second face view of the junction.

In operation, rotation of the shaft is driven in an angular direction 506 (FIG. 4) such that the OD surface of the runner moves in said direction from the ID face circumferential channel 160 out the ID face circumferential channel open end. This direction of rotation helps drive the buffer flow out of the ID face circumferential channel 160, carrying with it any debris so as to prevent the ID face circumferential channel from occluding. This is in distinction to the first face circumferential channel 150 wherein there is no continuous rotation relative to the mating housing face. Instead, there are merely constrained oscillatory movements between the first face 110 and housing. Nevertheless, in some implementations, it may be appropriate to have open ends on both the channels 150 and 160. As noted above, the depth $H_1$ of the first face channel 150 if open-ended may be insufficient to provide the desired air to the inter segment gap, particularly near end of life (e.g., as discussed above, unless channel 150 is made so deep so that it axially excessively extends into the stress field extending generally radially outward from the circumferential channel 160 face 165). However, an open end of the first face channel 150 may help evacuate any debris from the first face channel 150 even at small depth $H_1$ and associated small flow rates.

Even if the first face channel 150 has an open end, the buffer air flow rate through the first face channel 150 in example embodiments would be less than that through the ID face circumferential channel 160 due to lower cross-sectional area. Example flow rates are less than half of that through the ID face channel 160, more particularly, 0.1% to 50% with the lower limit being associated with a closed-ended channel first face channel 150 having minor leakage.

Although the example open end of the ID face circumferential channel 160 is the full cross-section of the channel upstream of the open end, other variations are possible including varied cross-section along the first face channel 150. In one group of examples, the opening may be of reduced cross-section relative to the rest of the channel so as to have a metering function or there may be a reduced cross-section metering section/region slightly upstream of the open end. Thus, an example open end or metering section is at least 30% of the cross-sectional area of the ID face channel 160 (e.g., a median cross-sectional area) upstream thereof, more narrowly, at least 50%. The median cross-section may be measured away from the feed channels 162 or projecting the circumferential channel wall across the junctions with the feed channels. In alternative embodiments, the open end or terminal portion (leg) 160-1 between the open end 168 and the closest feed channel 162 may be larger than the median cross-section along a remainder of the ID face circumferential channel 160. This may include non-constant cross-sections along the terminal portion 160-1 such as a flaring or turning configuration. Thus, an example cross-sectional area at a minimum cross-sectional area location along the terminal portion 160-1 may be an example 30% and 200% of the cross-sectional area of the ID face channel 160 upstream thereof.

Component manufacture and assembly techniques may be otherwise conventional. Metallic runners may be machined (e.g., on a lathe or turning machine from stock material or from a rough casting. Metallic runners may be assembled to the shaft via thermal interference fit and or interfitting anti-rotation features such as splines (not shown). Non-metallic runners (e.g., ceramic or ceramic matrix composite (CMC) may be molded and finish machined (e.g., on a lathe or turning machine). Such non-metallic runners may have anti-rotation features mated to corresponding shaft features or corresponding features of the metallic runner or spacer (e.g., castellation features—not shown) to limit potential cracking from thermal interference.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing or new baseline engine or seal configuration, details of such baseline may influence details of particular implementations. Accordingly, other embodiments are within the scope of the following claims.

What is claimed is:

1. A seal segment comprising an arcuate body having:
a first end;
a second end circumferentially opposite the first end;
a first face;
a second face axially opposite the first face;
an inner diameter (ID) face; and
an outer diameter (OD) face,
wherein:
the seal segment is shaped to interfit with a plurality of identical seal segments first end to second end to form a seal surrounding a central longitudinal axis;
the first face has:
a circumferential channel closer to the ID face than the OD face; and
a plurality of channels extending from the circumferential channel to the OD face;
the ID face has:
a circumferential channel closer to the first face than the second face; and
a plurality of channels extending from the circumferential channel to the second face; and
the ID face circumferential channel has an open end at the first end.

2. The seal segment of claim 1 wherein:
the body is a majority by weight carbon.

3. The seal segment of claim 1 wherein:
the first end has a circumferential protrusion at the first face and ID face;
the second end has a circumferential rebate at the first face and ID face; and
the interfitting first end to second end is of the protrusion of each segment in the rebate of an adjacent segment.

4. The seal segment of claim 1 wherein:
the first face circumferential channel has a closed end proximate the first end.

5. The seal segment of claim 1 wherein:
the first face circumferential channel has a depth $H_1$; and
the ID face circumferential channel has a depth $H_2$ 120% to 500% of the first face circumferential channel depth $H_1$.

6. The seal segment of claim 1 wherein:
the first face circumferential channel has a width $W_1$; and
the ID face circumferential channel has a width $W_2$ 50% to 150% of the first face circumferential channel width $W_1$.

7. The seal segment of claim 1 wherein:
the first face has a dam radially inward of the first face circumferential channel and having a radial span $S_1$; and
the ID face has a dam axially between the ID face circumferential channel and the first face and having an axial span $S_2$ of 20% to 60% of $S_1$.

8. The seal segment of claim 7 wherein:
the first face circumferential channel has a depth $H_1$;
the ID face circumferential channel has a depth $H_2$ 120% to 500% of the first face circumferential channel depth $H_1$; and
the ID face dam span $S_2$ is greater than the first face circumferential channel depth $H_1$.

9. A turbomachine comprising:
a bearing in a bearing compartment;
a buffer chamber; and
a seal system isolating the bearing compartment from the buffer chamber and comprising:
a seal runner;
a segmented seal encircling the seal runner comprising a plurality of seal segments according to claim 1 interfitting first end to second end;
a garter spring holding the seal segments together;
a seal housing carrying the seal and having a first wall and a second wall; and
at least one spring biasing the seal segment first faces against the housing first wall,
wherein:
for each seal segment, a buffer flowpath from the buffer chamber to the bearing compartment extends from the second face, through the ID face plurality of channels to the ID face circumferential channel and out the ID face circumferential channel open end.

10. The turbomachine of claim 9 wherein:
the garter spring holds the seal in contact with a seal runner.

11. The turbomachine of claim 10 wherein:
the plurality of seal segments is three to twelve segments.

12. The turbomachine of claim 9 wherein:
the seal is a non-archbound seal.

13. The turbomachine of claim 9 wherein:
the at least one spring is a plurality of coil springs.

14. The turbomachine of claim 9 wherein:
for each seal segment:
the first end has a circumferential protrusion at the first face and ID face; and
the second end has a circumferential rebate at the first face and ID face;
the interfitting first end to second end is of the protrusion of each segment in the rebate of an adjacent segment;
the open end is at the first end; and
the interfitting leaves a gap between an end of each protrusion and a base of each rebate.

15. A method for using the turbomachine of claim 9, the method comprising:
driving rotation of a shaft carrying the runner; and
passing an airflow along the buffer flowpath from the buffer chamber to the bearing compartment.

16. The method of claim 15 further comprising:
directing another airflow for each seal segment from the OD face, through the first face plurality of channels to the first face circumferential channel to pass as a leakage flow over a first face dam radially inward of the first face circumferential channel.

17. The method of claim 16 wherein:
the airflow has a first flow rate; and
the another airflow has a second flow rate less than half of the first flow rate.

18. The method of claim 15 wherein:
the rotation is in an angular direction from the ID face circumferential channel out the ID face circumferential channel open end for the segments.

19. The method of claim 18 wherein:
the rotation is effective to drive debris from the ID face circumferential channel.

20. A method for using a turbomachine, the turbomachine comprising:
a bearing in a bearing compartment;
a buffer chamber; and
a seal system isolating the bearing compartment from the buffer chamber and comprising:
a seal runner;
a segmented seal encircling the seal runner comprising a plurality of seal segments each seal segment comprising an arcuate body having:
a first end;
a second end circumferentially opposite the first end;
a first face;
a second face axially opposite the first face;
an inner diameter (ID) face; and
an outer diameter (OD) face, wherein:
the seal segment is shaped to interfit with a plurality of identical seal segments first end to second end to form a seal surrounding a central longitudinal axis;
the first face has:
a circumferential channel closer to the ID face than the OD face; and
a plurality of channels extending from the circumferential channel to the OD face;
the ID face has:
a circumferential channel closer to the first face than the second face; and
a plurality of channels extending from the circumferential channel to the second face; and
the ID face circumferential channel has an open end; and
the plurality of segments interfit first end to second end;
a garter spring holding the seal segments together;
a seal housing carrying the seal and having a first wall and a second wall; and
at least one spring biasing the seal segment first faces against the housing first wall,
wherein:
for each seal segment, a buffer flowpath from the buffer chamber to the bearing compartment extends from the second face, through the ID face plurality of channels to the ID face circumferential channel and out the ID face circumferential channel open end,
the method comprising:
driving rotation of a shaft carrying the runner; and
passing an airflow along the buffer flowpath from the buffer chamber to the bearing compartment,
wherein:
the rotation is in an angular direction from the ID face circumferential channel out the ID face circumferential channel open end for the segments; and
the rotation is effective to drive debris from the ID face circumferential channel.

21. A method for using a turbomachine, the turbomachine comprising:
- a bearing in a bearing compartment;
- a buffer chamber; and
- a seal system isolating the bearing compartment from the buffer chamber and comprising:
  - a seal runner;
  - a segmented seal encircling the seal runner comprising a plurality of seal segments each seal segment comprising an arcuate body having:
    - a first end;
    - a second end circumferentially opposite the first end;
    - a first face;
    - a second face axially opposite the first face;
    - an inner diameter (ID) face; and
    - an outer diameter (OD) face, wherein:
      - the seal segment is shaped to interfit with a plurality of identical seal segments first end to second end to form a seal surrounding a central longitudinal axis;
      - the first face has:
        - a circumferential channel closer to the ID face than the OD face; and
        - a plurality of channels extending from the circumferential channel to the OD face;
      - the ID face has:
        - a circumferential channel closer to the first face than the second face; and
        - a plurality of channels extending from the circumferential channel to the second face; and
        - the ID face circumferential channel has an open end; and
      - the plurality of segments interfit first end to second end;
  - a garter spring holding the seal segments together;
  - a seal housing carrying the seal and having a first wall and a second wall; and
  - at least one spring biasing the seal segment first faces against the housing first wall,
- wherein:
  - for each seal segment, a buffer flowpath from the buffer chamber to the bearing compartment extends from the second face, through the ID face plurality of channels to the ID face circumferential channel and out the ID face circumferential channel open end, the method comprising:
- driving rotation of a shaft carrying the runner; and
- passing an airflow along the buffer flowpath from the buffer chamber to the bearing compartment; and
- directing another airflow for each seal segment from the OD face, through the first face plurality of channels to the first face circumferential channel to pass as a leakage flow over a first face dam radially inward of the first face circumferential channel, wherein:
- the airflow has a first flow rate; and
- the another airflow has a second flow rate less than half of the first flow rate.

* * * * *